United States Patent [19]

Nakagaki et al.

[11] Patent Number: 5,710,942
[45] Date of Patent: Jan. 20, 1998

[54] ADAPTER MONITORING STORAGE CAPACITY OF ITS BUFFER AND SEQUENTIALLY GENERATING READY SIGNALS TO NOTIFY A TERMINAL TO TRANSFER MORE BURST DATA TO THE BUFFER

[75] Inventors: Tatsuru Nakagaki; Toshio Irie, both of Kawasaki, Japan

[73] Assignee: Fujitsu Limited, Kawasaki, Japan

[21] Appl. No.: 420,311

[22] Filed: Apr. 10, 1995

Related U.S. Application Data

[62] Division of Ser. No. 62,165, May 17, 1993, Pat. No. 5,519,835, and a continuation of Ser. No. 810,052, Dec. 19, 1991, abandoned.

[30] Foreign Application Priority Data

Dec. 20, 1990 [JP] Japan ................... 2-412370

[51] Int. Cl.$^6$ ........................................ G06F 13/00
[52] U.S. Cl. ............................ 395/872; 395/835; 395/854; 395/855
[58] Field of Search .............. 370/94.1, 60, 58.1; 395/250, 872, 875, 854, 855

[56] References Cited

U.S. PATENT DOCUMENTS

| | | | |
|---|---|---|---|
| 3,891,804 | 6/1975 | Hachenburg | 370/798 |
| 4,047,159 | 9/1977 | Boudry | 364/900 |
| 4,298,978 | 11/1981 | Nakamura | 370/92 |
| 4,636,790 | 1/1987 | Diamond | 340/825.52 |
| 4,677,616 | 6/1987 | Franklin | 370/94 |
| 4,688,035 | 8/1987 | Gray et al. | 370/825.52 |
| 4,730,348 | 3/1988 | MacCrisken | 375/122 |
| 4,736,369 | 4/1988 | Barzilai et a l. | 370/94 |
| 4,841,526 | 6/1989 | Wilson et al. | 371/32 |
| 4,926,420 | 5/1990 | Shimizu | 370/94.1 |
| 5,007,051 | 4/1991 | Dolkas et al. | 370/85.1 |
| 5,029,164 | 7/1991 | Goldstein et al. | 370/95.1 |

(List continued on next page.)

FOREIGN PATENT DOCUMENTS

| | | |
|---|---|---|
| 0 345 120 | 2/1990 | European Pat. Off. . |
| 0 385 431 | 9/1990 | European Pat. Off. . |
| 0 413 488 | 2/1991 | European Pat. Off. . |

(List continued on next page.)

OTHER PUBLICATIONS

Busschaert et al, "A Rate Adaption Coprocessor for Terminal Adapters and U–Interface Modems", Dec. 1989, pp. 1625–1633.

Stallings, "Data and Computer Communications," 1988, pp. 137–140.

"High–Performance Parallel Interface, Mechanical, Electrical, and Signalling Protocol Specification (HPPI–PH)," Preliminary draft proposed by American National Standard for information systems, X3T9/88–127, X3T9.3/88–023, Rev. 7.0, Dec. 11, 1989, pp. 1–46.

*Primary Examiner*—Thomas C. Lee
*Assistant Examiner*—Le Hien Luu
*Attorney, Agent, or Firm*—Staas & Halsey

[57] ABSTRACT

A broadband integrated services digital network includes a network, first and second terminals, and first and second terminal adapters. Each of the first and second terminal adapters includes a buffer storing a predetermined number of bursts of data from either the first or second terminal and storing a predetermined number of bursts of data from the network, and a first part for sending ready notification information to the network and for receiving the ready notification information from the network. The ready notification information shows that the buffer has an available storage capacity equal to at least one burst. Each of the first and second terminal adapters further includes a second part for sending ready information to the corresponding one of the first and second terminals before the first part receives the ready notification information from the network. At least, one burst is written into the buffer each time the ready information is sent.

2 Claims, 8 Drawing Sheets

U.S. PATENT DOCUMENTS

| | | | |
|---|---|---|---|
| 5,048,013 | 9/1991 | Eng et al. | 370/79 |
| 5,051,988 | 9/1991 | Kawahigashi et al. | 370/99 |
| 5,063,562 | 11/1991 | Barzilai et al. | 370/94.1 |
| 5,067,123 | 11/1991 | Hyodo et al. | 370/58.1 |
| 5,119,403 | 6/1992 | Krishnan | 375/39 |
| 5,136,584 | 8/1992 | Hedlund | 370/94.1 |
| 5,231,631 | 7/1993 | Buhrke et al. | 370/60 |
| 5,404,452 | 4/1995 | Detschel et al. | 395/250 |

FOREIGN PATENT DOCUMENTS

| | | |
|---|---|---|
| 54-051305 | 4/1979 | Japan . |
| 58-031783 | 7/1983 | Japan . |
| 58-031784 | 7/1983 | Japan . |
| 62-002748 | 1/1987 | Japan . |
| 63-132551 | 6/1988 | Japan . |
| 63-058504 | 11/1988 | Japan . |
| 64-029142 | 1/1989 | Japan . |
| 64-029146 | 1/1989 | Japan . |
| 64-061147 | 3/1989 | Japan . |
| 64-061148 | 3/1989 | Japan . |
| 1-286653 | 11/1989 | Japan . |
| 1-288137 | 11/1989 | Japan . |
| 2-149152 | 6/1990 | Japan . |
| 2-149157 | 6/1990 | Japan . |
| 2-062981 | 12/1990 | Japan . |
| 90/05419 | 5/1990 | WIPO . |

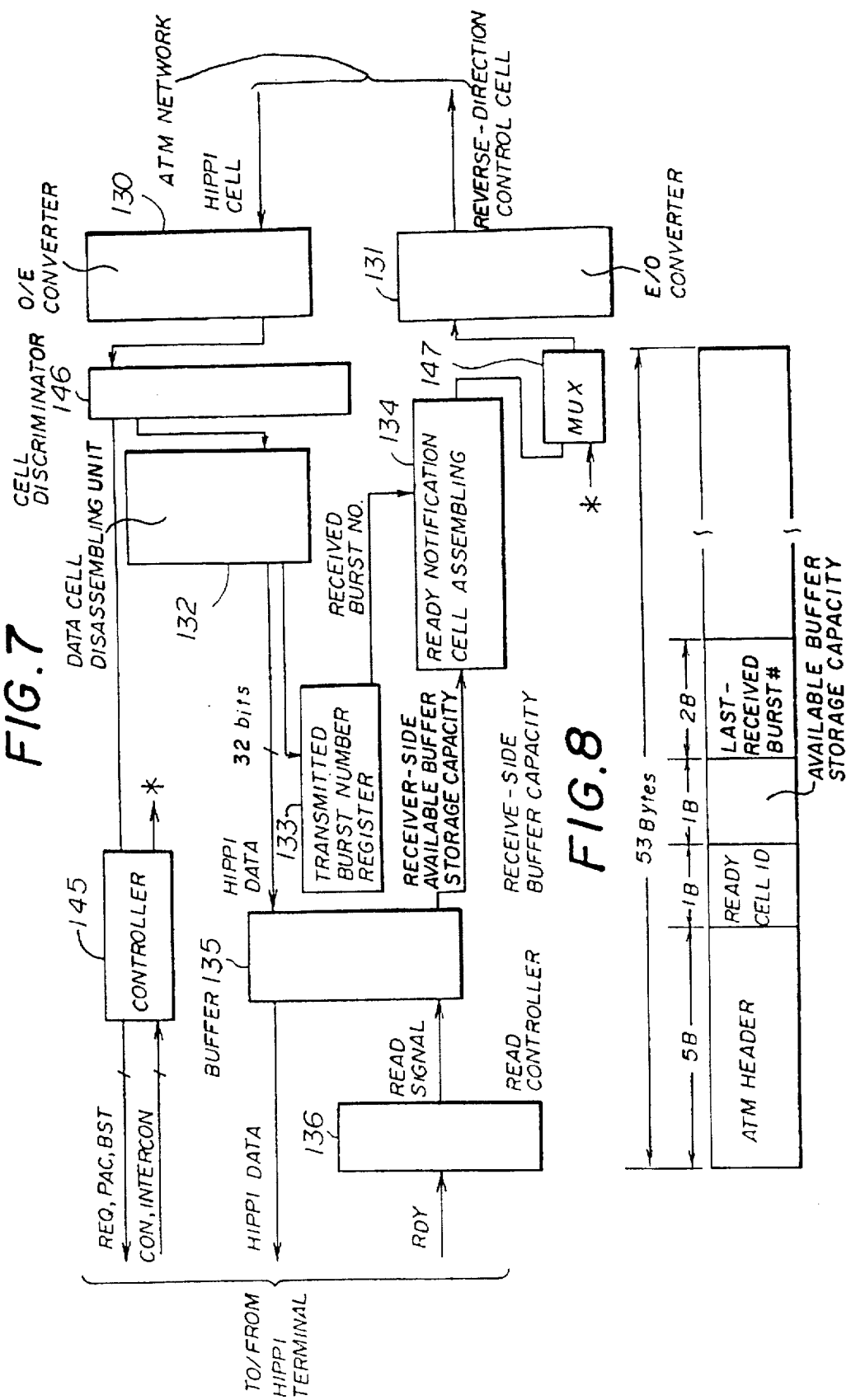

ADAPTER MONITORING STORAGE
CAPACITY OF ITS BUFFER AND
SEQUENTIALLY GENERATING READY
SIGNALS TO NOTIFY A TERMINAL TO
TRANSFER MORE BURST DATA TO THE
BUFFER

This application is a division of application Ser. No. 08/062,165, filed May 17, 1993, now U.S. Pat. No. 5,519,835 in turn a continuation of application No. 07/810,052, filed Dec. 19, 1991, now abandoned.

BACKGROUND OF THE INVENTION

(1) Field of the Invention

The present invention generally relates to broadband integrated services digital networks, and more particularly to a broadband integrated services digital network using an HIPPI (High-Performance Parallel Interface).

(2) Description of the Prior Art

Recently, a high-bit-rate data transfer interface called HIPPI has been proposed. The HIPPI is capable of transferring 800Mbps of data, and used, for example, for a high-speed transfer path of a super computer. A data transfer system is now planned in which computers and terminals in conformity with the HIPPI are coupled to each other via a high-speed network called a BISDN (Broadband Integrated Services Digital Network). Such a BISDN can be established by using, for example, an ATM (Asynchronous Transfer Mode) network.

FIG. 1 is a block diagram of a proposed HIPPI (see "HIGH-PERFORMANCE PARALLEL INTERFACE" X3T9/88-127 X3T9.3/88-023 REV 7.0, Dec. 11, 1989, the disclosure of which is hereby incorporated by reference). An HIPPI terminal 10 and an HIPPI terminal adapter (TA) 12 are connected to each other via a group of interface lines 11. The interface lines 11 include a data line, a request line, a connect line, two interconnect lines, a ready line, a burst line, and a packet line. 32-bit parallel data is transferred via the data line. A request to transfer data to the terminal adapter 12 from the terminal 10 is transferred via the request line. The connect line turns ON (switches to a high level) when the terminal adapter 12 switches to a state in which it can accept data. The interconnect line extending from the terminal adapter 12 informs the HIPPI terminal 10 that power supply to the terminal adapter 12 has been turned ON. The interconnect line extending from the HIPPI terminal 10 informs the terminal adapter 12 that power supply to the HIPPI terminal 10 has been turned ON. The terminal adapter 12 informs, via the ready line, the HIPPI terminal 10 that the terminal adapter 12 is ready to receive data. The burst line is ON (maintained at a high level) while the HIPPI terminal 10 is transmitting burst data to the terminal adapter 12. The packet line is ON (maintained at a high level) while the HIPPI terminal 10 is transmitting a packet to the terminal adapter 12.

FIG. 2 shows a frame hierarchy of data which is transferred via the above-mentioned interface. The frame hierarchy has a layer called "connection". Each connection is composed of a plurality of packets. Each packet is composed of a plurality of bursts, each being about 1 Kbytes of data.

During data transfer, the request line and the interconnect lines are ON. After that, a ready pulse is generated so that the terminal adapter 12 turns ON the ready line and then turns OFF the ready line. Then, the HIPPI terminal 10 can transmit burst data to the terminal adapter 12 via the data line. The terminal adapter 12 can send, before receiving burst data, to the HIPPI terminal 10 ready pulses equal in number to bursts which the terminal adapter 12 can receive. As has been described previously, the bit rate of data transferred between the HIPPI terminal 10 and the terminal adapter 12 is 800 Mbps.

An ATM network is suitable for a network which transfers data at a high bit rate, such as 800 Mbps. FIG. 3 is a block diagram of a BISDN which utilizes an ATM network. The above-mentioned HIPPI terminal 10 is coupled to an ATM network 14 via the terminal adapter 12. Similarly, an HIPPI terminal 18 is coupled to the ATM network 14 via an HIPPI terminal adapter 16. Data is transferred via the ATM network 14 in cell units. Each cell is, for example, 53-byte data which is composed of, for example, a header consisting of 5 bytes, and information of 48 bytes.

FIG. 4 is a diagram showing a data transfer sequence in which the HIPPI terminal 10 functions as a transmitter terminal and the HIPPI terminal 18 functions as a receiver terminal. The receiver terminal 18 sends the ready pulse to the terminal adapter 16, which sends to the terminal adapter 11 via the ATM network 12, a message which shows that the receiver terminal 18 has generated the ready pulse. In response to the message, the terminal adapter 11 sends a ready pulse to the transmitter terminal 10.

The transmitter terminal 10 transmits the first burst data #1 to the terminal adapter 11, which disassembles the first burst data #1 into a plurality of cells and sends these cells to the terminal adapter 16 via the ATM network 14. The terminal adapter 16 assembles the cells into burst data, which is output to the receiver terminal 18. In the sequence shown in FIG. 4, two ready pulses are successively sent to the transmitter terminal 10. Each time one ready pulse is received, the transmitter terminal 10 sends one burst to the receiver terminal 18. The receiver terminal 18 generates one ready pulse, when receiving two burst data #1 and #2. In this manner, burst data is transferred from the transmitter terminal 10 to the receiver terminal 18.

As described above, the transmitter terminal 10 does not send burst data to the receiver terminal 18 until the transmitter terminal 10 receives the ready pulse from the receiver terminal 18 which is in the burst receivable state. It should be noted that there is a delay in receipt of the ready pulse generated by the receiver terminal 18. In other words, the ATM network 14 has a delay in transfer of data. Hence, the transmitter terminal 10 does not efficiently send burst data to the receiver terminal 18. Further, if the ready pulse is discarded due to a congestion in the ATM network 14 or a failure in the communication system, the number of bursts recognized to be transmittable by the transmitter terminal 10 will be different from the number of bursts which is recognized to be receivable by the receiver terminal 18. In this case, the receiver terminal 18 sends the ready pulse to the transmitter terminal 10 and waits for burst data through the transmitter terminal 10 cannot send burst data to the receiver terminal 18 since the transmitter terminal 10 has not received the necessary ready pulse. In this case, the communication system comes to a deadlock state.

SUMMARY OF THE INVENTION

It is a general object of the present invention to provide a data transfer method and a BISDN using a data transfer method in which the above problems are eliminated.

A more specific object of the present invention is to provide a data transfer method, and a BISDN using a data transfer method in which data can be efficiently transferred without being affected by a delay in transmission of data via a network.

The above objects of the present invention are achieved by a broadband integrated services digital network comprising: a network; first and second terminals; a first terminal adapter coupling the first terminal to the network; and a second terminal adapter coupling the second terminal to the network. Each of the first and second terminal adapters comprises: a buffer storing a predetermined number of bursts of data from a corresponding one of the first and second terminals and storing a predetermined number of bursts of data from the network; first means for sending ready notification information to the network and for receiving the ready notification information from the network, the ready notification information showing that the buffer has an available storage capacity equal to at least one burst; and second means for sending ready information to the corresponding one of the first and second terminals before the first means receives the ready notification information from the network, at least one burst being written into the buffer each time the ready information is sent.

The above-mentioned objects of the present invention are also achieved by a data transfer method for a broadband integrated services digital network including a network, first and second terminals, a first terminal adapter coupling the first terminal to the network, and a second terminal adapter coupling the second terminal to the network, the data transfer method comprising the steps of: (a) sending ready notification information to the first terminal adapter from the second terminal adapter via the network, the ready notification information showing that a buffer provided in the second terminal adapter has an available storage capacity equal to at least one burst of data; and (b) sending ready information to the first terminal from the first terminal adapter before the first terminal adapter receives the ready notification information from the second terminal adapter, at least one burst being written into a buffer provided in the first terminal adapter each time the ready information is received by the first terminal.

BRIEF DESCRIPTION OF THE DRAWINGS

Other objects, features and advantages of the present invention will become more apparent from the following detailed description when read in conjunction with the accompanying drawings, in which:

FIG. 7 is a block diagram of a receiver part of each terminal adapter shown in FIG. 5;

FIG. 8 is a diagram showing a format of a ready notification cell;

DESCRIPTION OF THE PREFERRED EMBODIMENT

Figure 5:
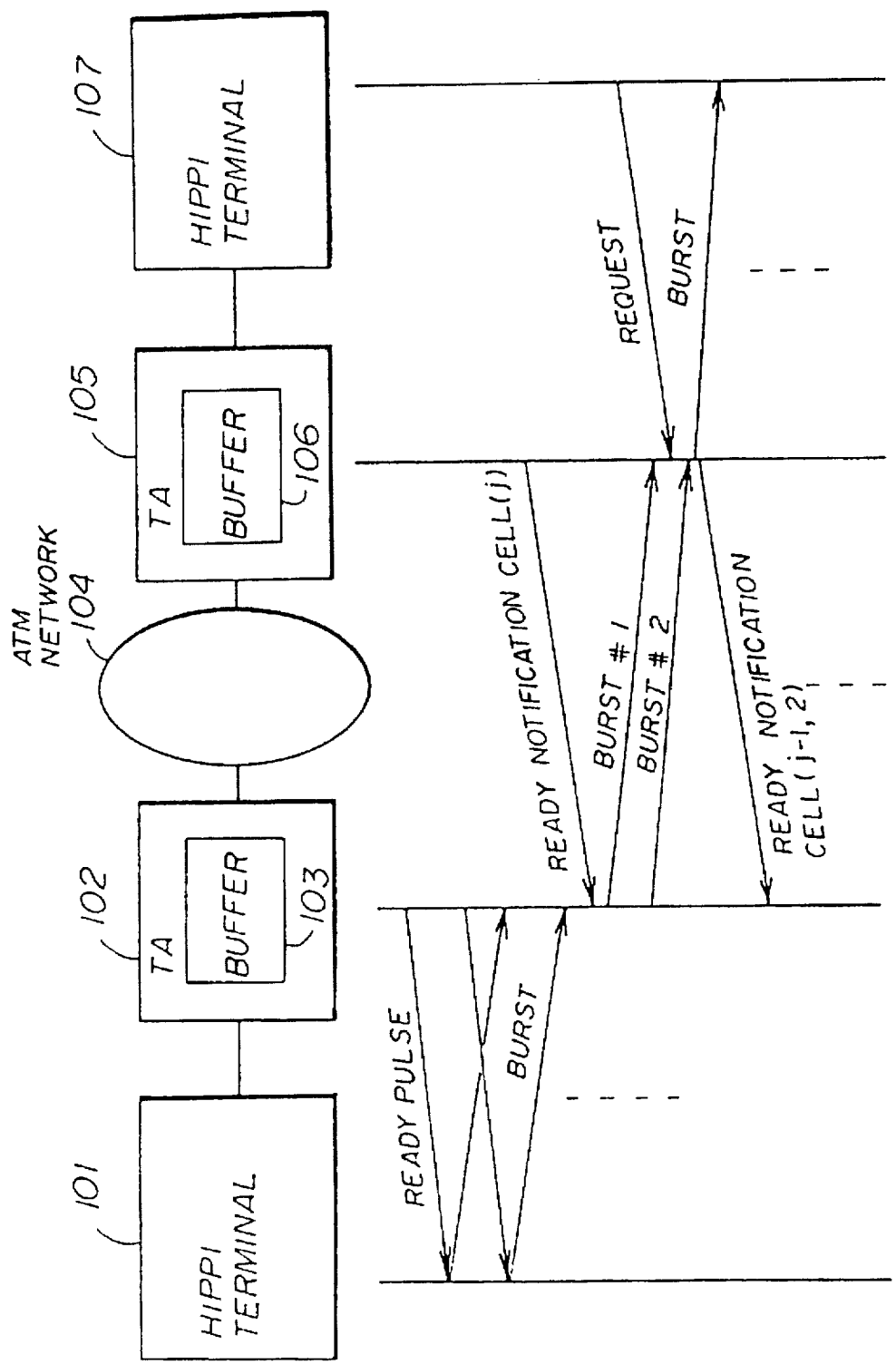
FIG. 5 is a block diagram showing an outline of an embodiment of the present invention.

FIG. 5 is a block diagram showing an outline of an embodiment of the present invention. A communication system shown in FIG. 5 is composed of HIPPI terminals 101 and 107, terminal adapters (TA) 102 and 105, and an ATM network 104. The terminal adapters 102 and 105 include buffers 103 and 106, respectively. Each of the buffers 103 and 106 has a storage capacity corresponding to a predetermined number of bursts. The storage capacity of the buffer 103 may be identical to or different from that of the buffer 106.

When the HIPPI terminal 101 functions as a transmitter terminal and the HIPPI terminal 105 functions as a receiver terminal, data is transferred in the following manner. The terminal adapter 102 sends to the HIPPI terminal 101 the number of ready pulses corresponding to the storage capacity of the buffer 103. The HIPPI terminal 101 sends bursts, equal in number to the ready pulses, to the terminal adapter 102. The bursts from the HIPPI terminal 101 are written into the buffer 103 of the terminal adapter 102. Initially the terminal adapter 105 on the data receiving side sends a ready notification cell to the terminal adapter 102 via the ATM network 104 without (or ahead of) receiving any request from the HIPPI terminal 107. The ready notification cell includes information showing the number of bursts (j bursts) acceptable by the buffer 106 of the terminal adapter 105. Further, the ready notification cell can include the number of the burst which was last received by the buffer 106. When a predetermined number of cells transmitted from the transmitter terminal 101 are received, the terminal adapter 105 on the data receiving side sends the ready notification cell to the terminal adapter 102. Instead, it is possible for the terminal adapter 105 to send the ready notification cell to the terminal adapter 102 at predetermined intervals.

If the terminal adapter 105 sends n bursts to the terminal adapter 102 until the ready notification cell sent by the terminal adapter 105 is received by the terminal adapter 102, the number of bursts which can be transmitted by the terminal adapter 102 is smaller, by n, than the number (j) of receivable bursts, as notified by the ready notification cell. It is necessary for the terminal adapter 102 on the data transmitting side to recognize how many bursts can be transmitted after the ready notification cell is received. For this purpose, each time the terminal adapter 102 sends one burst to the terminal adapter 105 via the ATM network 104, the terminal adapter 102 assigns a serial number (burst number) to the burst. The information part of the ready notification cell generated by the terminal adapter 105 on the data receiving side includes the serial number of the burst last received by the terminal adapter 105. The terminal adapter 102 can recognize the number of transmittable bursts by calculating the difference between the serial number of the burst sent to the terminal adapter 105 and the serial number of the burst included in the ready notification cell.

Figure 6:
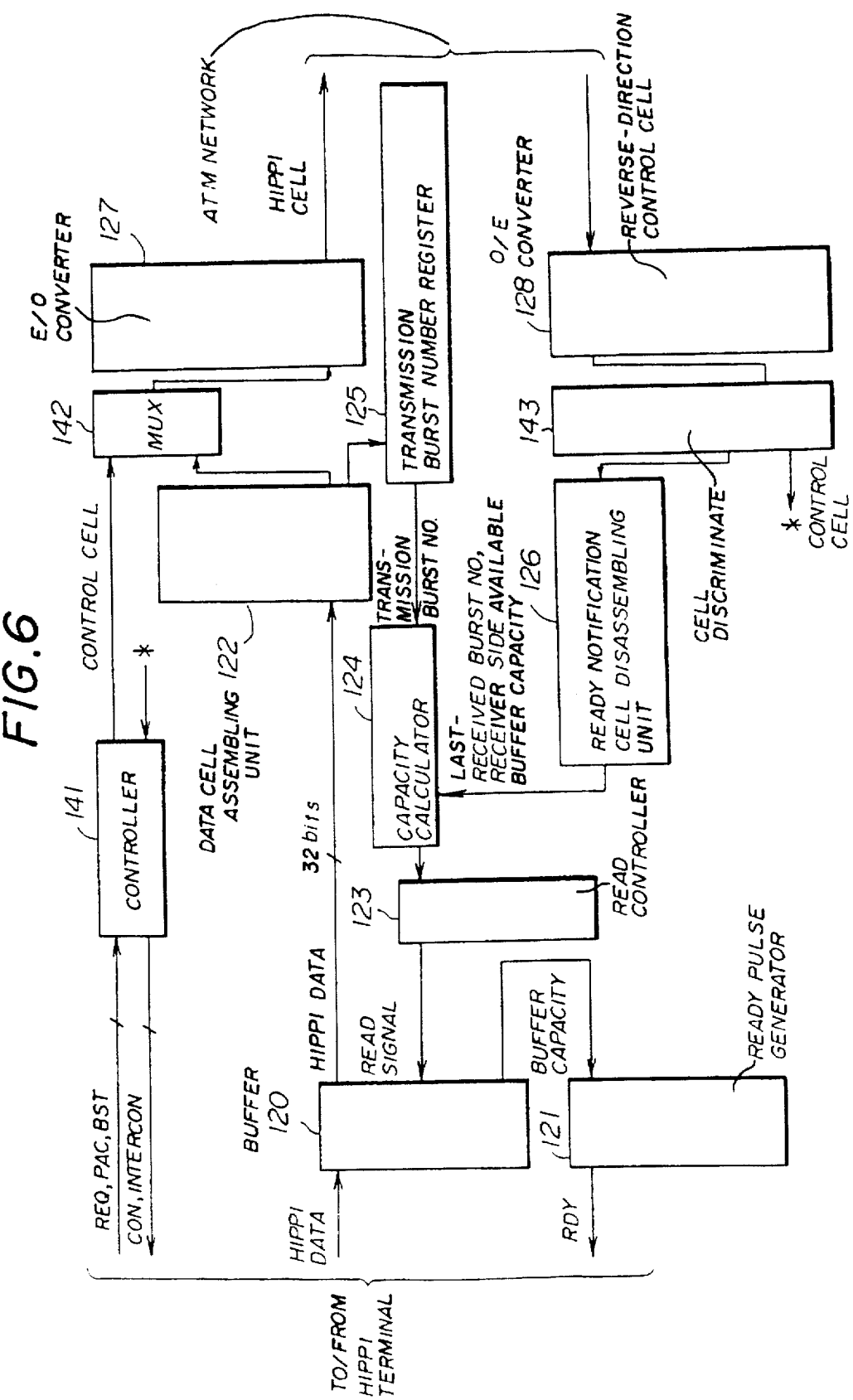
FIG. 6 is a block diagram of a transmitter part of each terminal adapter shown in FIG. 5.

Each of the terminal adapters 102 and 105 has a transmitter part shown in FIG. 6 and a receiver part shown in FIG. 7. Referring to FIG. 6, the transmitter part includes a buffer 120 (which corresponds to the buffer 102 or 106), a ready pulse generator 121, a data cell assembling unit 122, a read controller 123, a data-receiving-side buffer storage capacity calculator 124, a transmission burst number register 125, a ready notification cell disassembling unit 126, an electro-optic (E/O) converter 127, an opto-electric (O/E) converter 128, a controller 141, a multiplexer (MUX) 142 and a cell discriminator 143.

The buffer 120 is coupled to a transmitter part of the HIPPI terminal (not shown in FIG. 6), which also has a receiver part. The ready pulse generator 121 generates the ready pulse which permits the transmitter terminal to transmit one burst. The assembling unit 122 assembles HIPPI data (36-bit parallel data) read out from the buffer 120 into a cell. The read controller 123 controls the read operation on the buffer 120. The register 125 stores the number of the burst which is assigned and output by the assembling unit 122 (transmitted burst number). The multiplexer 142 multiplexes the cell generated by the assembling unit 122 and a control cell generated by the controller 141. The E/O converter 127 converts the cell which is an electric signal into an optical cell signal, which is sent, as an HIPPI cell, to the ATM network 104 (FIG. 5).

The O/E converter 128 converts an optical reverse-direction control cell from the ATM network 104 into an electric reverse-direction control cell. The cell discriminator 143 divides the reverse-direction control cell into a control cell and the ready notification cell. The ready notification cell disassembling unit 126 disassembles the ready notification cell into the received burst number (which was last received) and the storage capacity of the buffer on the data receiving side. The calculator 124, from the transmitted burst number, obtains the number of transmittable bursts, the received burst number and the storage capacity of the buffer on the data receiving side. More specifically, the calculator 124 calculates an available storage capacity of the buffer on the data receiving side by calculating the difference between the transmitted burst number and the burst number received from the storage capacity of the buffer on the data receiving side. The read controller 123 reads out the calculated number of bursts from the buffer 120.

The controller 141 is connected to the aforementioned request line, packet line and burst line, all of which extend from the transmitter part of the HIPPI terminal. The controller 141 generates the aforementioned control cell from the signals on the request line, packet line and burst line. The controller 141 receives the control cell from the cell discriminator 143, and controls the aforementioned connect and interconnect lines on the basis of the control cell.

The receiver part of the terminal adapter shown in FIG. 7 is composed of an opto-electric (O/E) converter 130, an electro-optic (E/O) converter 131, a data cell disassembling unit 132, a transmitted burst number register 133, a ready notification cell assembling unit 134, a buffer 135, a read controller 136, a controller 145, a cell discriminator 146 and a multiplexer (MUX) 147. The O/E converter 130 receives an optical HIPPI cell signal from the ATM network 104 and converts the HIPPI cell signal into an electric cell signal. The cell discriminator 146 divides the electric cell signal into the control cell generated by the controller 141 (FIG. 6) and the data cell output by the assembling unit 122 (FIG. 6). The control cell is output to the controller 145, and the data cell is output to the data cell disassembling unit 132, which disassembles the data cell from the cell discriminator 146 into HIPPI data (32-bit parallel data) and the transmitted burst number. The transmitted burst number register 133 stores the transmitted burst number from the disassembling unit 132. This transmitted burst number is output, as the received burst number, to the ready notification cell assembling unit 134.

Each time the read controller 136 receives the ready signal from the receiver part of the HIPPI terminal, it outputs a read signal to the buffer 135. In response to the read signal, the HIPPI data is read out from the buffer 135 and sent to the receiver part of the HIPPI terminal.

The ready notification cell assembling unit 134 receives data indicating an available storage capacity of the buffer 135, and the received burst number from the register 133. When the assembling unit 134 receives a predetermined number of bursts from the buffer 135, or when a predetermined time has elapsed, the assembling unit 134 assembles data indicating the available storage capacity of the buffer 135 and the received burst number into the ready notification cell.

FIG. 8 is a diagram of the ready notification cell. As shown in FIG. 8, the ready notification cell includes an ATM header (5 bytes), ready notification cell identification information (1 byte), the available storage capacity of the buffer 135 (1 byte) and the received burst number (2 bytes) indicating the burst which was last received.

Returning to FIG. 7, the multiplexer 147 multiplexes the ready notification cell and a control cell from the controller 145. A multiplexed signal which is an electric signal is converted into an optical signal by the E/O converter 131 and then output, as a reverse-direction control cell, to the ATM network 104. The controller 145 receives the control cell from the cell discriminator 146 and controls the aforementioned request line (labeled REQ), packet line (labeled PAC) and burst line (BST), all of which extend to the receiver part of the HIPPI terminal. The aforementioned connect line (labeled CON) and interconnect line (labeled INTERCON) which extend from the receiver part of the HIPPI terminal are then connected to the controller 145.

Figure 9:
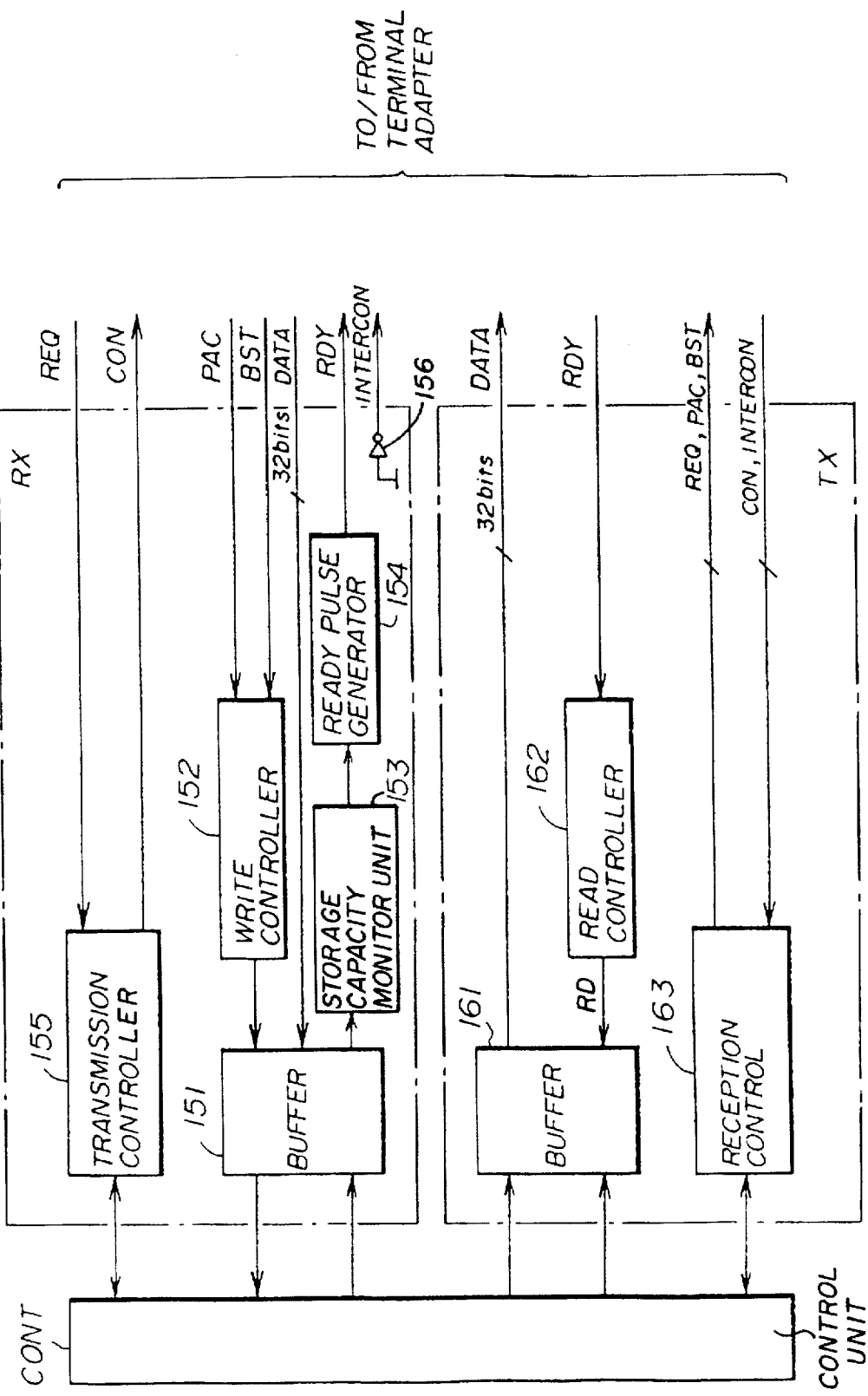
FIG. 9 is a block diagram of each HIPPI terminal shown in FIG. 5.

FIG. 9 is a block diagram of the HIPPI terminal 101 (107). The HIPPI terminal includes a control unit CONT in addition to the aforementioned receiver part (indicated by RX) and transmitter part (indicated by TX). The control unit CONT controls the entire operation of the HIPPI terminal. The receiver part RX is composed of a buffer 151, a write controller 152, a storage capacity monitor unit 153, a ready pulse generator 154, and a transmitter controller 155. The write controller 152 is connected to the packet line PAC and the burst line BST, both of which extend from the controller 145 shown in FIG. 7, and generates a write signal therefrom. In response to the write signal, the HIPPI data read out from the buffer 135 shown in FIG. 7 is written into the buffer 151. In response to a read signal generated and output by the control unit CONT, the HIPPI data is read out from the buffer 151 and output to the control unit CONT. The storage capacity monitor unit 153 monitors the available storage capacity of the buffer 151 and informs the ready pulse generator 154 of the available storage capacity. The ready pulse generator 154 generates the ready pulse when the buffer 151 has an available capacity corresponding to at least one burst.

The request line REQ extending from the controller 145 (FIG. 7) is connected to the controller 155, and the connect line CON extending from the controller 155 is connected to the controller 145. The controller 155 informs the control unit CONT of the state of the request line REQ. The interconnection line INTERCON is coupled to a power supply line via a buffer inverter 156. When power supply to the HIPPI terminal turns ON, the interconnection line INTERCON turns ON.

The transmitter part TX is composed of a buffer 161, a read controller 162 and a reception controller 163. Transmission data 32-bit HIPPI parallel data from the control unit CONT is written into the buffer 161 in response to a write signal WE generated and output by the control unit CONT. Each time the read controller 162 receives the ready pulse RDY, it outputs a read signal to the buffer 161. In response to the read signal RD, the HIPPI data is read out from the buffer 161 and output to the associated terminal adapter. The controller 163 receives a transmission request from the control unit CONT and controls the request line REQ, the packet line PAC and the burst line BST. Further, the controller 163 informs the control unit CONT of the states of the connect line CON and the interconnect line INTERCON.

Figure 10:
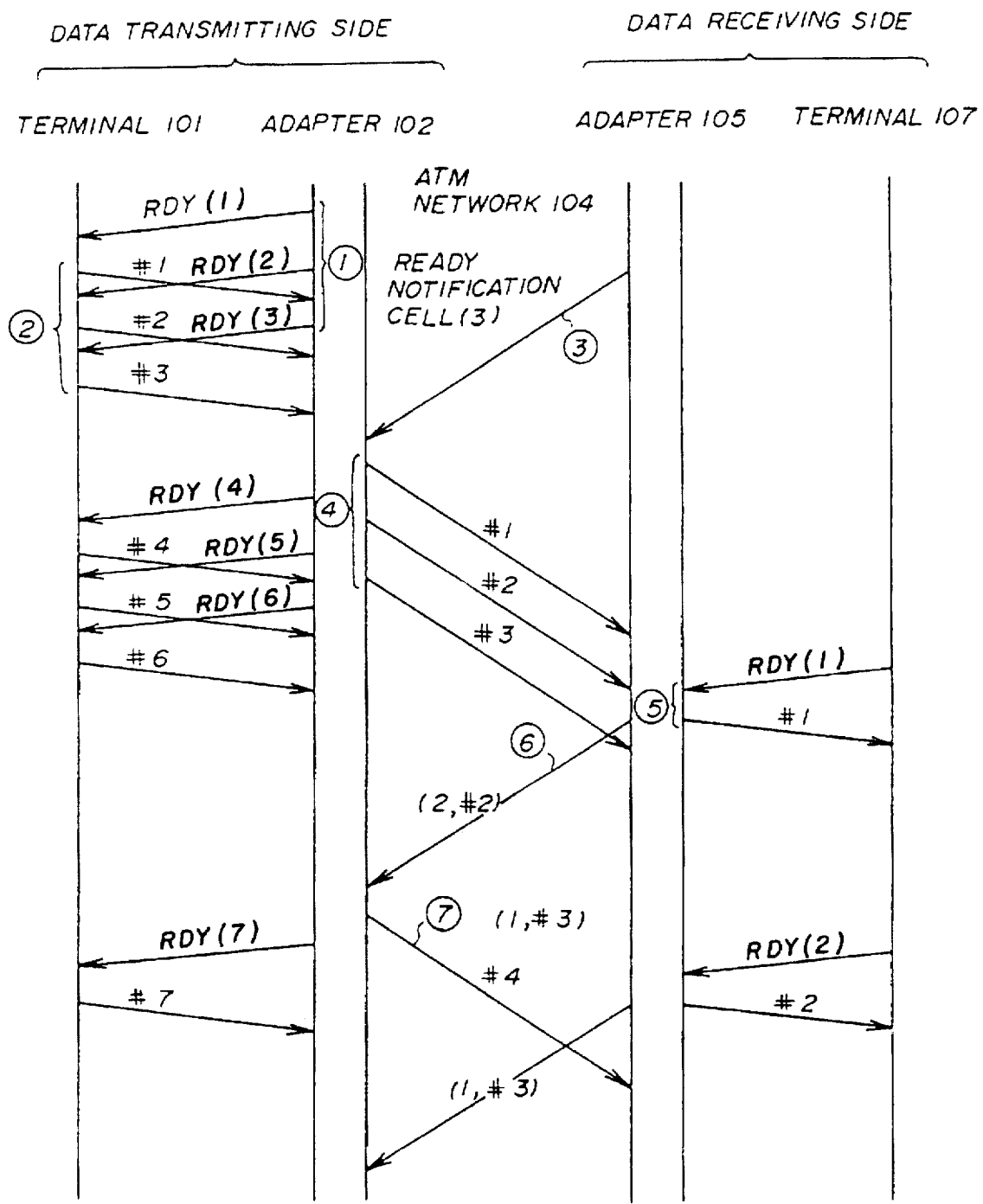
FIG. 10 is a diagram showing a sequence of data transfer according to the embodiment of the present invention.

FIG. 10 is a diagram of a sequence of the data transfer procedure according to the embodiment of the present invention. In the sequence shown in FIG. 10, it is assumed that the HIPPI terminal 101 shown in FIG. 5 functions as a transmitter terminal, and the HIPPI terminal 107 functions as a receiver terminal. The buffer 103 (FIG. 5) of the terminal adapter 102 on the data transmitting side has a storage capacity corresponding to three bursts, and the buffer 106 of the terminal adapter 105 on the data receiving side has a storage capacity corresponding to three bursts.

At the commencement of the sequence, the terminal adapter 102 successively sends three ready pulses RDY to the HIPPI terminal 101 (at step ①). Each time the HIPPI terminal receives the ready pulse DRY, it sends one burst to the terminal adapter 102. In this case, three bursts #1, #2 and #3 are sent to the terminal adapter 102 (at step ②). The three bursts #1, #2 and #3 are stored in the buffer 103 of the terminal adapter 102, and the terminal adapter 102 waits for the ready notification cell generated and output by the terminal adapter 105 on the data receiving side. The terminal adapter 102 receives the ready notification cell via the ATM network 104 (step ③), and recognizes, from the ready notification cell, that the number of bursts which can be stored in the buffer 106 of the terminal adapter 105 is equal to three. Then, the terminal adapter 102 assigns the transmitted burst numbers to the three bursts #1, #2 and #3, and successively sends the three bursts (step ④) via the ATM network 104.

Each time the terminal adapter 105 receives the ready pulse RDY from the HIPPI terminal 107, one burst is transferred to the HIPPI terminal 107 (step ⑤). When the terminal adapter 105 has received two bursts #1 and #2, it sends to the terminal adapter 102 the ready notification cell showing that an available storage capacity of the buffer 106 is equal to two and the received burst number indicating the burst which was last received is #2 (step ⑥). It will be noted that burst #1 has been sent to the HIPPI terminal 107 and hence only burst #2 is stored in the buffer 106.

Upon receiving the ready notification cell, the calculator 124 of the terminal adapter 102 on the data transmitting side calculates an available storage capacity of the buffer 106 of the terminal adapter 105 on the data receiving side. In the example being considered, the transmitted burst number indicating the burst which was last transmitted is #3, and hence 2−(4−3)=1. As a result, the terminal adapter 102 sends one burst #4 to the terminal adapter 105 via the ATM network 104 (at step ⑦). In the same manner as described above, the flow control procedure is executed and data is transferred from the HIPPI terminal 101 to the HIPPI terminal 107.

The present invention is not limited to the specifically disclosed embodiment, and variations and modifications may be made without departing from the scope of the present invention.

What is claimed is:

1. A terminal adapter for connecting a terminal to an ATM network and controlling the transmission over the ATM network of successive data bursts, supplied thereto by the terminal for transmission over the ATM network in accordance with a ready notification signal received from the ATM network, the ready notification signal including data indicating a number of data bursts appropriate for transmission over the ATM network, the terminal adapter comprising:

a buffer having a capacity of storing a plurality of data bursts to be transmitted over the ATM network;

read means, responsive to a ready notification signal received from the ATM network, for determining a number of data bursts to be transmitted over the ATM network and for reading the determined number of data bursts, in succession, from the buffer;

assembling means for assembling successive data bursts read from the buffer by said read means into one or more successive and respective ATM cells for transmission over the ATM network;

monitoring means for monitoring the current storage capacity of the buffer and thereby determining the current available storage capacity of the buffer for storage of a number of further data bursts therein and for sequentially generating and sending to the terminal a corresponding number of ready signals, each ready signal instructing the terminal to transmit a corresponding data burst to the adapter for storage in the buffer; and means for writing each data burst received from the terminal into the buffer.

2. A method for connecting a terminal to an ATM network thereby for controlling the transmission over the ATM network of successive data bursts, supplied thereto by the terminal for transmission over the ATM network in accordance with a ready notification signal received from the ATM network, the ready notification signal including data indicating a number of data bursts appropriate for transmission over the ATM network, comprising:

providing a buffer having a capacity of storing a plurality of data bursts to be transmitted over the ATM network;

determining, from a ready notification signal received from the ATM network, the appropriate a number of data bursts to be transmitted over the ATM network and reading the determined, appropriate number of data bursts, in succession, from the buffer;

assembling successive data bursts read from the buffer into one or more successive and respective ATM cells for transmission over the ATM network;

monitoring the current storage capacity of the buffer and thereby determining the current available storage capacity of the buffer for storage of a number of further data bursts therein and sequentially generating and sending to the terminal a corresponding number of ready signals, each ready signal instructing the terminal to transmit a corresponding data burst to the adapter for storage in the buffer; and writing each data burst received from the terminal into the buffer.

* * * * *

UNITED STATES PATENT AND TRADEMARK OFFICE
CERTIFICATE OF CORRECTION

PATENT NO.    : 5,710,942
DATED         : January 20, 1998
INVENTOR(S)   : Nakagaki et al.

It is certified that error appears in the above-identified patent and that said Letters Patent is hereby corrected as shown below:

Please delete columns 1-8 and substitute columns 1-10 as per attached.

Signed and Sealed this

Seventh Day of August, 2001

*Attest:*

*Attesting Officer*

NICHOLAS P. GODICI
*Acting Director of the United States Patent and Trademark Office*

ADAPTER MONITORING STORAGE CAPACITY OF ITS BUFFER AND SEQUENTIALLY GENERATING READY SIGNALS TO NOTIFY A TERMINAL TO TRANSFER MORE BURST DATA TO THE BUFFER

This application is a division of application Ser. No. 08/062,165, filed May 17, 1993, now U.S. Pat. No. 5,519,835, in turn a continuation of application Ser. No. 07/810,052, filed Dec. 19, 1991, now abandoned.

BACKGROUND OF THE INVENTION (1) Field of the Invention

The present invention generally relates to broadband integrated services digital networks and, more particularly, to a broadband integrated services digital network using an HIPPI (High-Performance Parallel Interface).

(2) Description of the Prior Art

Recently, a high-bit-rate data transfer interface called HIPPI has been proposed. The HIPPI is capable of transferring 800 Mbps of data, and is proposed for use, for example, as a high-speed transfer path of a super computer. A data transfer system is now planned in which computers and terminals in conformity with the HIPPI are coupled to each other via a high-speed network called a BISDN (Broadband Integrated Services Digital Network). Such a BISDN can be established by using, for example, an ATM (Asynchronous Transfer Mode) network.

Figure 1:
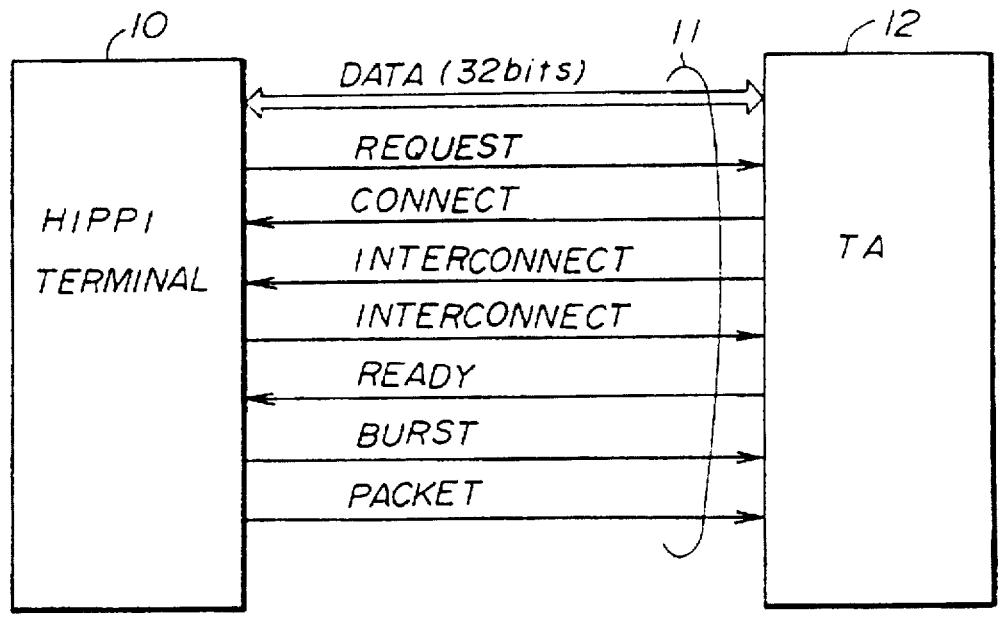
FIG. 1 a block diagram showing an HIPPI.

FIG. 1 is a block diagram of a proposed HIPPI (see "HIGH-PERFORMANCE PARALLEL INTERFACE" X3T9/88-127 X3T9.3/88-023 REV 7.0, Dec. 11, 1989, the disclosure of which is hereby incorporated by reference). An HIPPI terminal 10 and an HIPPI terminal adapter (TA) 12 are connected to each other via a group of interface lines 11. The interface lines 11 include a data line, a request line, a connect line, two interconnect lines, a ready line, a burst line, and a packet line. 32-bit parallel data is transferred via the data line. A request to transfer data to the terminal adapter 12 from the terminal 10 is transferred via the request line. The connect line turns ON (switches to a high level) when the terminal adapter 12 switches to a state in which it can accept data. The interconnect line extending from the terminal adapter 12 informs the HIPPI terminal 10 that power supply to the terminal adapter 12 has been turned ON. The interconnect line extending from the HIPPI terminal 10 informs the terminal adapter 12 that power supply to the HIPPI terminal 10 has been turned ON. The terminal adapter 12 informs, via the ready line, the HIPPI terminal 10 that the terminal adapter 12 is ready to receive data. The burst line is ON (maintained at a high level) while the HIPPI terminal 10 is transmitting burst data to the terminal adapter 12. The packet line is ON (maintained at a high level) while the HIPPI terminal 10 is transmitting a packet to the terminal adapter 12.

Figure 2:
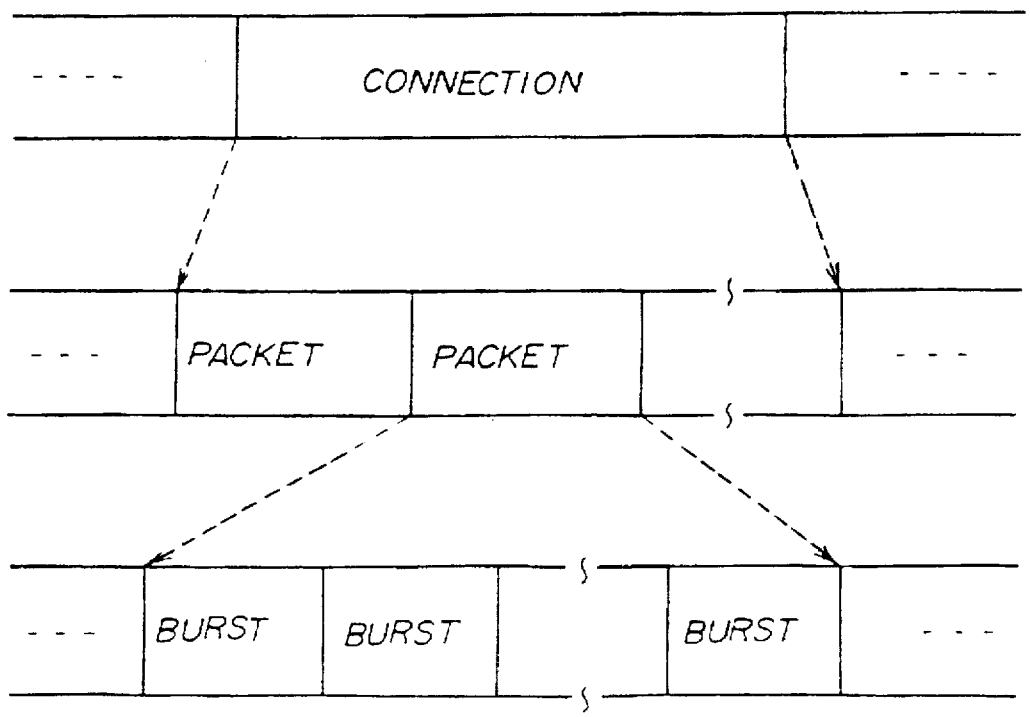
FIG. 2 is a diagram of a frame hierarchy of data which is transferred via the HIPPI shown in FIG. 1.

FIG. 2 shows a frame hierarchy of data which is transferred via the above-mentioned interface. The frame hierarchy has a layer called "connection". Each connection comprises a plurality of packets. Each packet comprises a plurality of bursts, each containing about 1K bytes of data.

During data transfer, the request line and the interconnect lines are ON. After than, a ready pulse is generated so that the terminal adapter 12 turns ON the ready line and then turns OFF the ready line. Then, the HIPPI terminal 10 can transmit burst data to the terminal adapter 12 via the data line. The terminal adapter 12 can send, before receiving burst data, to the HIPPI terminal 10 ready pulses equal in number to the number of bursts which the terminal adapter 12 can receive. As has been described previously, the bit rate of data transferred between the HIPPI terminal 10 and the terminal adapter 12 is 800 Mbps.

Figure 3:
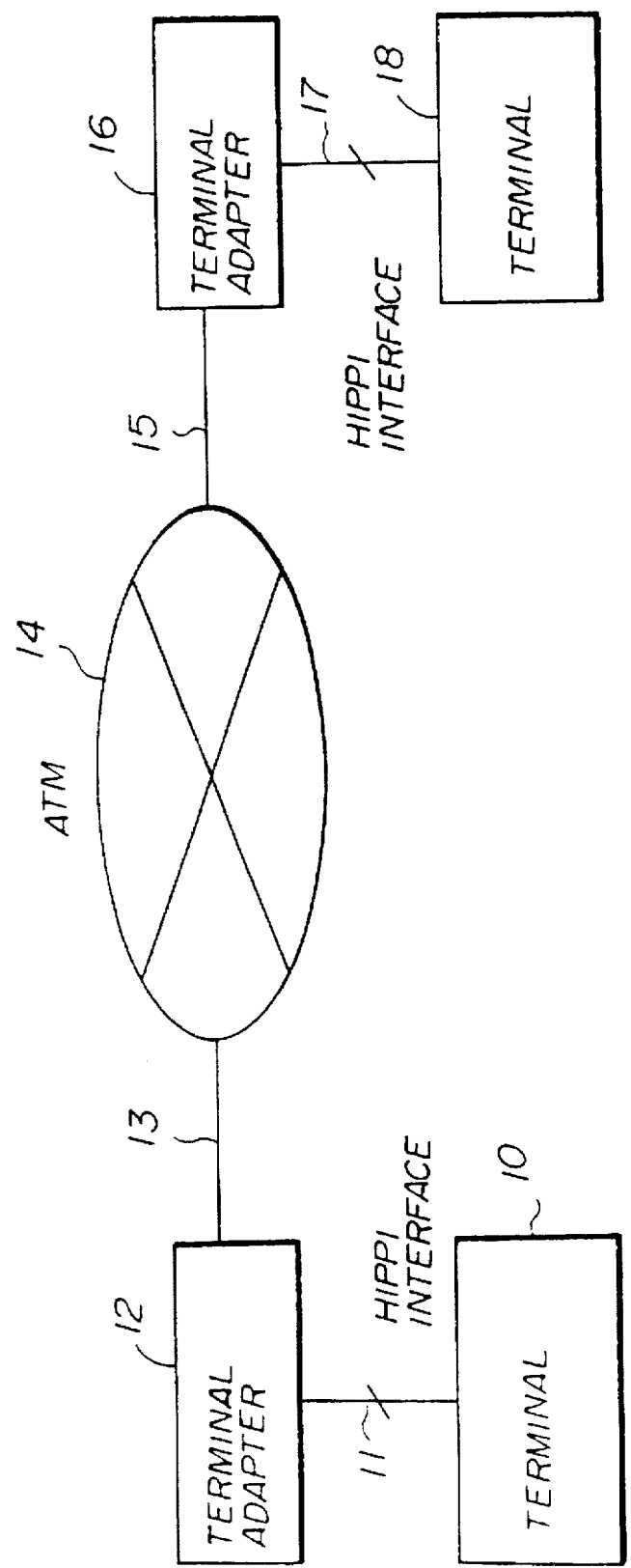
FIG. 3 is a block diagram of an HIPPI-based communication system having an ATM network.

An ATM network is suitable for use as a network which transfers data at a high bit rate, such as 800 Mbps. FIG. 3 is a block diagram of a BISDN which utilizes an ATM network. The above-mentioned HIPPI terminal 10 is coupled to an ATM network 14 via the terminal adapter 12. Similarly, an HIPPI terminal 18 is coupled to the ATM network 14 via an HIPPI terminal adapter 16. Data is transferred via the ATM network 14 in cell units. Each cell is, for example, 53-byte data which is composed of, for example, a header consisting of 5 bytes, and information of 48 bytes.

Figure 4:
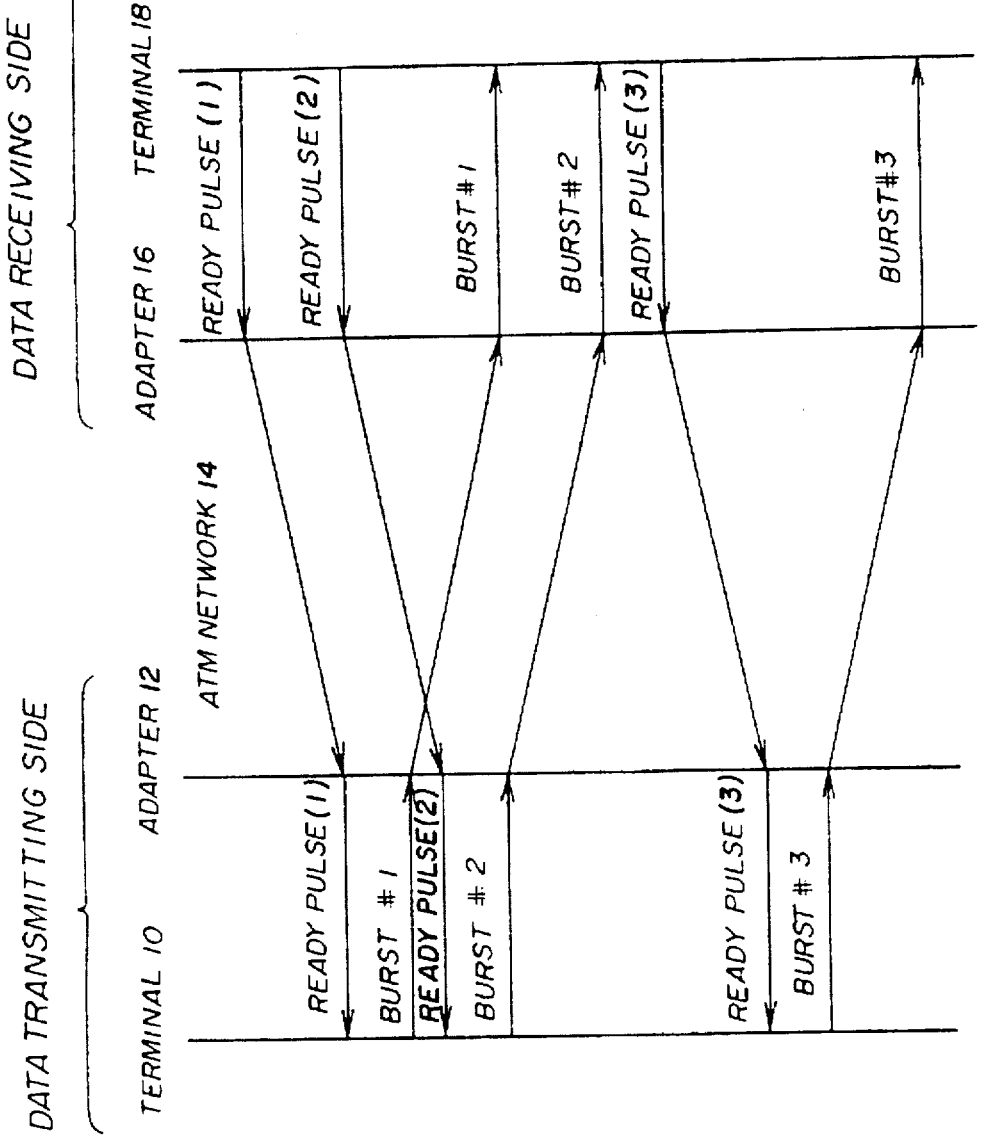
FIG. 4 is a diagram showing a conventional data transfer procedure of the communication system shown in FIG. 3.

FIG. 4 is a diagram showing a data transfer sequence in which the HIPPI terminal 10 functions as a transmitter terminal and the HIPPI terminal 18 functions as a receiver terminal. The receiver terminal 18 sends the ready pulse to the terminal adapter 16, which sends to the terminal adapter 12, via the ATM network 14, a message which shows that the receiver terminal 18 has generated the ready pulse. In response to the message, the terminal adapter 12 sends a ready pulse to the transmitter terminal 10.

The transmitter terminal 10 transmits the first burst data #1 to the terminal adapter 12, which disassembles the first burst data #1 into a plurality of cells and sends these cells to the terminal adapter 16 via the ATM network 14. The terminal adapter 16 assembles the cells into burst data, which is output to the receiver terminal 18. In the sequence shown in FIG. 4, two ready pulses are successively sent to the transmitter terminal 10. Each time one ready pulse is received, the transmitter terminal 10 sends one burst to the receiver terminal 18. The receiver terminal 18 generates a further ready pulse, after receiving the two burst data #1 and #2. In this manner, burst data is transferred from the transmitter terminal 10 to the receiver terminal 18.

As described above, the transmitter terminal 10 does not send burst data to the receiver terminal 18 until the transmitter terminal 10 receives the ready pulse from the receiver terminal 18 which is in the burst receivable state. It should be noted that there is a delay in the receipt by terminal adapter 12 and terminal 10 of the ready pulse generated by the receiver terminal 18. In other words, the ATM network 14 introduces a delay in the transfer of data. Hence, the transmitter terminal 10 does not efficiently send burst data to the receiver terminal 18. Further, if the ready pulse is discarded due to a congestion in the ATM network 14 or a failure in the communication system, the number of bursts recognized by the transmitter terminal 10 as being transmittable by the transmitter terminal 10 will be different from the number of bursts which is recognized to be receivable by the receiver terminal 18. In this case, the receiver terminal 18 sends the ready pulse to the transmitter terminal 10 and waits for burst data, even though the transmitter terminal 10 cannot send burst data to the receiver terminal 18 since the transmitter terminal 10 has not received the necessary ready pulse. In this case, the communication system reaches a deadlocked state.

SUMMARY OF THE INVENTION

It is a general object of the present invention to provide a data transfer method and a BISDN using a data transfer method in which the above problems are eliminated.

A more specific object of the present invention is to provide a data transfer method, and a BISDN using a data transfer method, in which data can be efficiently transferred without being affected by a delay in transmission of data via a network.

The above objects of the present invention are achieved by a broadband integrated services digital network comprising: a network; first and second terminals; a first terminal adapter coupling the first terminal to the network; and a second terminal adapter coupling the second terminal to the network. Each of the first and second terminal adapters comprises: a buffer having a capacity of storing a predetermined number of bursts of data from the corresponding one of the first and second terminals and storing a predetermined number of bursts of data from the network; first means for sending ready notification information to the network and for receiving the ready notification information from the network, the ready notification information indicating that the buffer has an available storage capacity equal to at least one burst; and second means for sending ready information to the corresponding one of the first and second terminals before the first means receives the ready notification information from the network, at least one burst being written into the buffer each time the ready information is sent.

The above-mentioned objects of the present invention are also achieved by a data transfer method for a broadband integrated services digital network including a network, first and second terminals, a first terminal adapter coupling the first terminal to the network, and a second terminal adapter coupling the second terminal to the network, the data transfer method comprising the steps of: (a) sending ready notification information to the first terminal adapter from the second terminal adapter via the network, the ready notification information indicating that a buffer provided in the second terminal adapter has an available storage capacity equal to at least one burst of data; and (b) sending ready information to the first terminal from the first terminal adapter before the first terminal adapter receives the ready notification information from the second terminal adapter, at least one burst being written into a buffer provided in the first terminal adapter each time the ready information is received by the first terminal.

BRIEF DESCRIPTION OF THE DRAWINGS

Other objects, features and advantages of the present invention will become more apparent from the following detailed description when read in conjunction with the accompanying drawings, in which:

FIG. 1 is a block diagram showing an HIPPI;

FIG. 2 is a diagram of a frame hierarchy of data which is transferred via the HIPPI shown in FIG. 1;

FIG. 3 is a block diagram of an HIPPI-based communication system having an ATM network;

FIG. 4 is a diagram showing a conventional data transfer procedure of the communication system shown in FIG. 3;

FIG. 5 is a block diagram of an embodiment of the present invention;

FIG. 6 is a block diagram of a transmitter part of each terminal adapter shown in FIG. 5;

FIG. 7 is a block diagram of a receiver part of each terminal adapter shown in FIG. 5;

FIG. 8 is a diagram showing a format of a ready notification cell;

FIG. 9 is a block diagram of each HIPPI terminal shown in FIG. 5; and

FIG. 10 is a diagram showing a sequence of data transfer according to the embodiment of the present invention.

DESCRIPTION OF THE PREFERRED EMBODIMENT

FIG. 5 is a block diagram of an embodiment of the present invention. A communication system shown in FIG. 5 is composed of HIPPI terminals 101 and 107, terminal adapters (TA) 102 and 105, and an ATM network 104. The terminal adapters 102 and 105 include buffers 103 and 106, respectively. Each of the buffers 103 and 106 has a storage capacity corresponding to a predetermined number of bursts. The storage capacity of the buffer 103 may be identical to or different from that of the buffer 106.

When the HIPPI terminal 101 functions as a transmitter terminal and the HIPPI terminal 105 functions as a receiver terminal, data is transferred in the following manner. The terminal adapter 102 sends to the HIPPI terminal 101 a number of ready pulses corresponding to the storage capacity of the buffer 103. The HIPPI terminal 101 sends bursts, equal in number to the number of ready pulses, to the terminal adapter 102. The bursts from the HIPPI terminal 101 are written into the buffer 103 of the terminal adapter 102. Initially the terminal adapter 105 on the data receiving side sends a ready notification cell to the terminal adapter 102 via the ATM network 104 without (i.e., independently of, or ahead of) receiving any request from the HIPPI terminal 107. The ready notification cell includes information indicating the number of bursts (e.g., "j" bursts) acceptable by the buffer 106 of the terminal adapter 105 (i.e., the presently available burst storage capacity of buffer 106. Further, the ready notification cell can include the number of the burst which was last received by the buffer 106. When a predetermined number of bursts transmitted from the transmitter terminal 101 are received by the terminal adapter 105, the terminal adapter 105 on the data receiving side sends the ready notification cell indicating the remaining (and thus presently available) burst storage capacity of buffer 106 to the terminal adapter 102. Instead, it is possible for the terminal adapter 105 to send the ready notification cell to the terminal adapter 102 at predetermined intervals.

If the terminal adapter 102 sends (n) bursts to the terminal adapter 105 prior to the ready notification cell, sent by the terminal adapter 105, being received by the terminal adapter 102, the number of bursts which can be transmitted by the terminal adapter 102 is smaller, by (n), than the number (j) of receivable bursts, as indicated by the ready notification cell which was last received by the terminal adapter 102. It therefore is necessary for the terminal adapter 102 on the data transmitting side to determine how many bursts actually can be transmitted, based on the last-received ready notification cell. For this purpose, each time the terminal adapter 102 sends one burst to the terminal adapter 105 via the ATM network 104, the terminal adapter 102 assigns a serial number (burst number) to the burst. The information part of the ready notification cell generated by the terminal adapter 105 on the data receiving side includes the serial number of the burst last received by the terminal adapter 105. The terminal adapter 102 can determine the present number of transmittable bursts by calculating the difference between the serial number of the transmission burst to be sent to the terminal adapter 105 and the serial number of the burst included in the ready notification cell.

Each of the terminal adapters 102 and 105 has a transmitter part shown in FIG. 6 and a receiver part shown in FIG. 7. Referring to FIG. 6, the transmitter part includes a buffer 120 (which corresponds to the buffer 103 or 106), a ready pulse generator 121, a data cell assembling unit 122, a read controller 123, a data-receiving-side buffer storage capacity calculator 124, a transmission burst number register 125, a ready notification cell disassembling unit 126, an electro-optic (E/O) converter 127, an opto-electric (O/E) converter 128, a controller 141, a multiplexer (MUX) 142 and a cell discriminator 143.

The buffer 120 is coupled to a transmitter part of the HIPPI terminal (not shown in FIG. 6), which also has a receiver part. The ready pulse generator 121 generates the ready pulse which permits the transmitter terminal to transmit one burst. The assembling unit 122 assembles HIPPI data (32-bit parallel data) read out from the buffer 120 into a cell. The read controller 123 controls the read operation on the buffer 120. The register 125 stores the number of the burst which is assigned and output by the assembling unit 122 (transmission burst number). The multiplexer 142 multiplexes the cell generated by the assembling unit 122 and a control cell generated by the controller 141. The E/O converter 127 converts the cell which is an electric signal into an optical cell signal, which is sent, as an HIPPI cell, to the ATM network 104 (FIG. 5).

The O/E converter 128 converts an optical reverse-direction control cell from the ATM network 104 into an electric reverse-direction control cell. The cell discriminator 143 divides the reverse-direction control cell into a control cell and the ready notification cell. The ready notification cell disassembling unit 126 disassembles the ready notification cell into the received burst number (i.e., the number of the burst which was last received) and the available storage capacity of the buffer on the data receiving side. The calculator 124, from the transmission burst number, obtains the number of transmittable bursts taking further into account the received burst number and the storage capacity of the buffer on the data receiving side, as provided thereto by the ready notification cell disassembling unit 126. More specifically, the calculator 124 calculates an available storage capacity of the buffer on the data receiving side by calculating the difference, between the transmission burst number and the received burst number, from the storage capacity of the buffer on the data receiving side. The read controller 123 reads out the calculated number of bursts (corresponding to the available storage capacity of the buffer on the data receiving side) from the buffer 120.

The controller 141 is connected to the aforementioned request (REQ) line, packet (PAC) line and burst (BST) line, all of which extend from the transmitter part of the HIPPI terminal. The controller 141 generates the aforementioned control cell from the signals on the request line, packet line and burst line. The controller 141 receives the control cell from the cell discriminator 143, and controls the aforementioned connect and interconnect lines on the basis of the control cell.

The receiver part of the terminal adapter shown in FIG. 7 is composed of an opto-electric (O/E) converter 130, an electro-optic (E/O) converter 131, a data cell disassembling unit 132, a transmitted burst number register 133, a ready notification cell assembling unit 134, a buffer 135, a read controller 136, a controller 145, a cell discriminator 146 and a multiplexer (MUX) 147. The O/E converter 130 receives an optical HIPPI cell signal from the ATM network 104 and converts the HIPPI cell signal into an electric cell signal. The cell discriminator 146 divides the electric cell signal into the control cell (as was previously generated by the controller 141 (of FIG. 6)) and the data cell (as was output by the assembling unit 122 (of FIG. 6)). The control cell is output to the controller 145, and the data cell is output to the data cell disassembling unit 132, which disassembles the data cell from the cell discriminator 146 into HIPPI data (32-bit parallel data) and the transmitted burst number (i.e., the transmission burst number, as previously assigned in the transmitter and as actually received at the receiver part of FIG. 7). The transmitted burst number register 133 stores the transmitted burst number supplied thereto by the disassembling unit 132. This transmitted burst number is output, as the received burst number, to the ready notification cell assembling unit 134.

Each time the read controller 136 receives the ready (RDY) signal from the receiver part of the HIPPI terminal, it outputs a read signal to the buffer 135. In response to the read signal, the HIPPI data is read out from the buffer 135 and sent to the receiver part of the HIPPI terminal.

The ready notification cell assembling unit 134 receives data indicating the available storage capacity of the buffer 135, and the received burst number from the register 133. When the assembling unit 134 receives a predetermined number of bursts from the buffer 135, or when a predetermined time has elapsed, the assembling unit 134 assembles the data indicating the available storage capacity of the buffer 135 and the received burst number into the ready notification cell.

FIG. 8 is a diagram of the ready notification cell. As shown in FIG. 8, the ready notification cell includes an ATM header (5 bytes), ready notification cell identification information (1 byte), the available storage capacity (AVAILABLE BUFFER STORAGE CAPACITY) of the buffer 135 (1 byte) and the received burst number (2 bytes) indicating the number of the burst which was last received.

Returning to FIG. 7, the multiplexer 147 multiplexes the ready notification cell and a control cell from the controller 145. The multiplexed signal, which is an electric signal, is converted into an optical signal by the E/O converter 131 and then output, as a reverse-direction control cell, to the ATM network 104.

The controller 145 receives the control cell from the cell discriminator 146 and controls the aforementioned request line (labeled REQ), packet line (labeled PAC) and burst line (BST), all of which extend to the receiver part of the HIPPI terminal. The aforementioned connect line (labeled CON) and the interconnect line (labeled INTERCON) which extend from the receiver part of the HIPPI terminal are then connected to the controller 145.

FIG. 9 is a block diagram of the HIPPI terminal 101 (107). The HIPPI terminal includes a control unit CONT in addition to the aforementioned receiver part (indicated by RX) and transmitter part (indicated by TX). The control unit CONT controls the entire operation of the HIPPI terminal. The receiver part RX is composed of a buffer 151, a write controller 152, a storage capacity monitor unit 153, a ready pulse generator 154, and a transmitter controller 155. The write controller 152 is connected to the packet line PAC and the burst line BST, both of which extend from the controller 145 shown in FIG. 7, and generates a write signal therefrom. In response to the write signal, the HIPPI data read out from the buffer 135 shown in FIG. 7 is written into the buffer 151. In response to a read signal generated and output by the control unit CONT, the HIPPI data is read out from the buffer 151 and output to the control unit CONT. The storage capacity monitor unit 153 monitors the available storage capacity of the buffer 151 and informs the ready pulse generator 154 of the available storage capacity. The ready pulse generator 154 generates the ready pulse when the buffer 151 has an available capacity corresponding to at least one burst.

The request line REQ extending from the controller 145 (FIG. 7) is connected to the controller 155, and the connect line CON extending from the controller 155 is connected to the controller 145. The controller 155 informs the control unit CONT of the state of the request line REQ. The interconnection line INTERCON is coupled to a power supply line via a buffer inverter 156. When power supply to the HIPPI terminal turns ON, the interconnection line INTERCON turns ON.

The transmitter part TX is composed of a buffer 161, a read controller 162 and a reception controller 163. Transmission data, i.e., 32-bit HIPPI parallel data, from the control unit CONT is written into the buffer 161 in response to a write signal WE generated and output by the control unit CONT. Each time the read controller 162 receives the ready pulse RDY, it outputs a read signal to the buffer 161. In response to the read signal RD, the HIPPI data is read out from the buffer 161 and output to the associated terminal adapter. The controller 163 receives a transmission request from the control unit CONT and controls the request line REQ, the packet line PAC and the burst line BST. Further, the controller 163 informs the control unit CONT of the states of the connect line CON and the interconnect line INTERCON.

FIG. 10 is a diagram of a sequence of the data transfer procedure according to the embodiment of the present invention. In the sequence shown in FIG. 10, it is assumed that the HIPPI terminal 101 shown in FIG. 5 functions as a transmitter terminal, and the HIPPI terminal 107 functions as a receiver terminal. The buffer 103 (FIG. 5) of the terminal adapter 102 on the data transmitting side has a storage capacity corresponding to three bursts, and the buffer 106 of the terminal adapter 105 on the data receiving side has a storage capacity corresponding to three bursts.

At the commencement of the sequence, the terminal adapter 102 successively sends three ready pulses RDY to the HIPPI terminal 101 (at step ①). Each time the HIPPI terminal receives the ready pulse RDY, it sends one burst to the terminal adapter 102. In this case, the three ready signals RDY 1, 2 and 3 from adapter 102 to terminal 101 respectively produce the three bursts #1, #2 and #3 which are sent by terminal 101 to the terminal adapter 102 (at step ②). The three bursts #1, #2 and #3 are stored in the buffer 103 of the terminal adapter 102, and the terminal adapter 102 waits for receipt, over the ATM network 104, of the ready notification cell, as generated and output by the terminal adapter 105 on the data receiving side. When the terminal adapter 102 receives the ready notification cell via the ATM network 104 (step ③), it recognizes, from the data "(3)" of the received ready notification cell, that the number of bursts which can be stored in the buffer 106 of the terminal adapter 105 is equal to three. Then, the terminal adapter 102 assigns the transmission burst numbers to the three bursts #1, #2 and #3, and successively sends the three bursts #1, #2 and #3 (step ④) via the ATM network 104. As shown in FIG. 10, as the adapter 102 transmits, in succession, the bursts #1, #2 and #3, in corresponding succession it sends ready signals RDY 4, 5 and 6 to the terminal 101 which, in turn and respectively, sends the corresponding succession of bursts #4, #5 and #6 to the adapter 102.

Each time the terminal adapter 105 receives the ready pulse RDY from the HIPPI terminal 107, one burst is transferred from the buffer 135 (FIG. 7) to the HIPPI terminal 107 (step ⑤). When the terminal adapter 105 has received two bursts #1 and #2, it sends to the terminal adapter 102 the ready notification cell, indicating that the available storage capacity of the buffer 106 is equal to two ("2") and that the received burst number, indicating the burst which was last received, is #2 (step ⑥). It will be noted that burst #1 has been sent to the HIPPI terminal 107 and burst #3 has not yet been received at adapter 105, and hence only burst #2 is currently stored in the buffer (step ⑤).

Upon receiving the ready notification cell, the calculator 124 of the terminal adapter 102 on the data transmitting side calculates the actual, available storage capacity of the buffer 106 of the terminal adapter 105 on the data receiving side. In the example being considered, the transmitted burst number, indicating the burst which was last transmitted, is #3, and hence the transmission burst number of the burst next to be transmitted by adapter 102 is #4; on the other hand, the ready notification cell from adapter 105 (at step ⑥) indicated a current buffer storage capacity of "(2)" (i.e., a current capacity for storing "2" bursts) and that the number of the last burst received by adapter 105 was "#2". Hence: 2−(4−3)=1. As a result, the terminal adapter 102 sends the single burst #4 to the terminal adapter 105 via the ATM network 104 (at step ⑦). In the same manner as described above, the flow control procedure continues to be executed and data to be transferred from the HIPPI terminal 101 to the HIPPI terminal 107 as shown by the succession of (numbered) ready (RDY) signals and related (numbered) bursts, as between the associated adapter 102 and terminal 101 and the associated adapter 105 and terminal 107, correlated with the (numbered) burst transmissions from adapter 102 over ATM network 104 to adapter 105 and the ready notification cell transmissions from adapter 105 over ATM network 104 to adapter 102.

The present invention is not limited to the specifically disclosed embodiment, and variations and modifications may be made without departing from the scope of the present invention.

What is claimed is:

1. A terminal adapter for connecting a terminal to an ATM network and controlling the transmission over the ATM network of successive data bursts, supplied thereto by the terminal for transmission over the ATM network in accordance with a ready notification signal received from the ATM network, the ready notification signal including data indicating a number of data bursts appropriate for transmission over the ATM network, the terminal adapter comprising:

a buffer having a capacity of storing a plurality of data bursts to be transmitted over the ATM network;

read means, responsive to a ready notification signal received from the ATM network, for determining a number of data bursts to be transmitted over the ATM network and for reading the determined number of data bursts, in succession, from the buffer;

assembling means for assembling successive data bursts read from the buffer by said read means into one or more successive and respective ATM cells for transmission over the ATM network;

monitoring means for monitoring the current storage capacity of the buffer and thereby determining the current available storage capacity of the buffer for storage of a number of further data bursts therein and for sequentially generating and sending to the terminal a corresponding number of ready signals, each ready signal instructing the terminal to transmit a corresponding data burst to the adapter for storage in the buffer; and means for writing each data burst received from the terminal into the buffer.

2. A method for connecting a terminal to an ATM network thereby for controlling the transmission over the ATM network of successive data bursts, supplied thereto by the terminal for transmission over the ATM network in accordance with a ready notification signal received from the ATM network, the ready notification signal including data indicating a number of data bursts appropriate for transmission over the ATM network, comprising:

providing a buffer having a capacity of storing a plurality of data bursts to be transmitted over the ATM network;

determining, from a ready notification signal received from the ATM network, the appropriate a number of data bursts to be transmitted over the ATM network and reading the determined, appropriate number of data bursts, in succession, from the buffer;

assembling successive data bursts read from the buffer into one or more successive and respective ATM cells for transmission over the ATM network;

monitoring the current storage capacity of the buffer and thereby determining the current available storage capacity of the buffer for storage of a number of further data bursts therein and sequentially generating and sending to the terminal a corresponding number of ready signals, each ready signal instructing the terminal to transmit a corresponding data burst to the adapter for storage in the buffer; and writing each data burst received from the terminal into the buffer.

* * * * *